United States Patent [19]

Crankshaw et al.

[11] 4,024,011

[45] May 17, 1977

[54] LABEL APPLICATOR WITH REPETITIVE SEQUENTIAL FIRING ORDER AND METHOD

[75] Inventors: Michael Crankshaw, Santa Fe Springs; Leo Kucheck, Irvine; Donald Lee Caudill, Riverside, all of Calif.

[73] Assignee: Compac Corporation, Montebello, Calif.

[22] Filed: June 24, 1976

[21] Appl. No.: 699,264

[52] U.S. Cl. .............................. 156/299; 156/285; 156/363; 156/542; 156/562; 156/566; 156/584; 221/73; 271/195

[51] Int. Cl.² ........................................ B32B 31/10

[58] Field of Search .......... 156/299, 285, 542, 566, 156/562, 363, 584; 221/74, 73, 211; 271/97, 98, 195, 197

[56] References Cited

UNITED STATES PATENTS

| | | | |
|---|---|---|---|
| 2,802,598 | 8/1957 | Petterson | 221/73 |
| 3,025,211 | 3/1962 | Winn | 156/542 |

*Primary Examiner*—Edward G. Whitby
*Attorney, Agent, or Firm*—Gordon L. Peterson

[57] ABSTRACT

Labels are supplied in groups to a labelling station with the labels of each group being arranged in a row. The labels are releasably retained at the labelling station. The articles to be labelled are moved through the labelling station with the row of labels at the labelling station extending in the same direction as the direction of article movement. Each of the labels is transferred to an associated article as the articles are moved through the labelling station. The labels are sequentially transferred with the most downstream label always being the next label to be transferred.

16 Claims, 5 Drawing Figures

LABEL APPLICATOR WITH REPETITIVE SEQUENTIAL FIRING ORDER AND METHOD

BACKGROUND OF THE INVENTION

Label applicators apply labels to articles as the articles are conveyed past the label applicator. Typically, the labels are releasably adhered, in a single column, to an elongated backing strip. The label applicator removes one of the labels from the backing strip and releasably retains it at a labelling station. As the article to be labelled nears the removed label, it is applied to the article. Label applicators of this type are shown, for example, in U.S. Pat. Nos. 3,093,528 and 3,729,362.

Label applicators of this type, while satisfactory for many applications, can introduce delay into as assembly or packaging operation in which labelling must be carried out. For example, the backing strip with the labels thereon is customarily provided on a supply reel. During use of the label applicator, the backing strip is moved from the supply reel to take-up reel. Periodically, the supply of labels on the supply reel becomes exhausted whereupon the empty supply reel and the full take-up reel must be replaced with new reels. The frequency of this change, as well as the amount of downtime, will vary depending upon numerous circumstances. However, by way of example, the reels may have to be changed at 50 minute intervals with approximately 4 minutes of downtime required to accomplish the change. Thus, reel changes may account for approximately an 8 percent loss in production time.

Label indexing or advance; i.e., the removal of a label from the backing strip and applying it to suitable retaining means, is relatively slow while the transfer of a retained label to the article can be rapidly carried out. Label indexing can be sufficiently slow so that the labelling function is caused to be the slowest operation on the production line.

It is known to use a wide backing strip and to provide two side-by-side columns of labels on the backing strip. In this event, two labels are simultaneously removed and releasably retained at the labelling station. The two labels are simultaneously transferred from the retaining means to either the same or different articles. If the labels are transferred to the same article, the downtime problems and slow indexing problems discussed above are not solved.

In order that this prior art construction can be used to apply the labels to different articles, it is necessary that article spacing bear a predetermined relationship to label spacing on the retaining means so that the articles and the labels are properly relatively positioned. This problem is so significant that this arrangement is basically unsuited for most label application jobs. To illustrate, if article spacing or article size are large compared to the labels, the width of the backing strip would have to be greatly enlarged so that the labels would be correspondingly widely spaced on the retaining means. This would result in a great waste of paper in a substantial increase in the size of the supply and take-up reels and the associated apparatus to such an extent that any time saved is not worth the cost involved to obtain it.

SUMMARY OF THE INVENTION

The present invention reduces downtime of the label applicator and materially increases its speed of operation. This is accomplished without wasting paper used for the backing strip. In fact, the present invention provides an opportunity to reduce backing strip width per label.

This invention provides for supplying labels to the retaining means in groups with the labels of each group being arranged in a row. The articles are moved through the labelling station in a first direction and the axis of the row of labels extends generally in the first direction. The row of labels on the retaining means includes at least first and second labels with the first label being downstream, in the direction of article movement, of the second label. Transferring means transfers the first and second labels from the retaining means to first and second articles, respectively, as the first and second articles are moved through the labelling station.

An important feature of this invention is the provision of control means for controlling the transferring means. In the preferred transferring order or firing order, the control means causes the transferring means to initiate the transfer of the first label to the first article before initiating the transfer of the second label to the second article. In other words, the labels are transferred sequentially, in a reverse firing order, with the most downstream label always being the next label to be transferred.

The supplying means for supplying the labels can be any device which is capable of intermittently supplying a group of labels. For example, the labels can be sheet fed or roll fed to the retaining means. If the labels are roll fed, they may be provided in two or more side-by-side columns on an elongated backing strip. This increases the number of labels per roll with the result that downtime of the label applicator for the purpose of changing reels occurs much less frequently than with the above-described prior art label applicator.

Another advantage of the present invention is that labels are supplied in groups to the retaining means. This means that only one label supplying operation per N labels (where N is the number of labels supplied) is required, whereas in the prior art, one label supplying operation per label was required. This time shares the relatively slow label supplying function with two or more label transfers with the result that the label applicationoperation is materially speeded up.

The control means causes the labels to be transferred sequentially, rather than simultaneously, from the retaining means to the articles to be labelled. For this reason, the spacing, if any, of the labels on the retaining means can be totally independent of article size and article spacing. This means that the narrowest possible backing strip capable of carrying the columns of labels in side-by-side relationship can be used. The paper used for the backing strip on a per label basis can be reduced because the labels in adjacent columns can be very close together; i.e., have only a very small area or margin of backing strip in between, whereas in a conventional single column of labels, the backing strip has margins extending on both sides of the single column of labels. For example, six columns of labels of ⅞ inch diameter on a common backing strip would use about ⅓ of the margin area that would be used if each column of labels were on a separate backing strip. As the margin area represents wasted paper, this invention in the above example would waste only about ⅓ as much paper as the conventional approach.

By always using the most downstream label as the next label to be applied, the unlabelled articles have the greatest distance to travel during the time that a second group of labels is being supplied to the retaining means. Accordingly, even though the articles may be travelling at a high rate of speed, the relatively great distance which they must travel in order to be in position for the next reverse firing sequence provides ample time for the relatively slow label supplying operation.

The label transfer operation can be controlled in various different ways, including the use of one or more article sensors. The labels may be retained and transferred in various different ways. For example, vacuum retention can be used to releasably retain the labels, and an air blast or tamping can be used to transfer the labels to the article.

The invention can best be understood by reference to the following description taken in connection with the accompanying illustrative drawings.

DESCRIPTION OF THE PREFERRED EMBODIMENT

Figure 1:
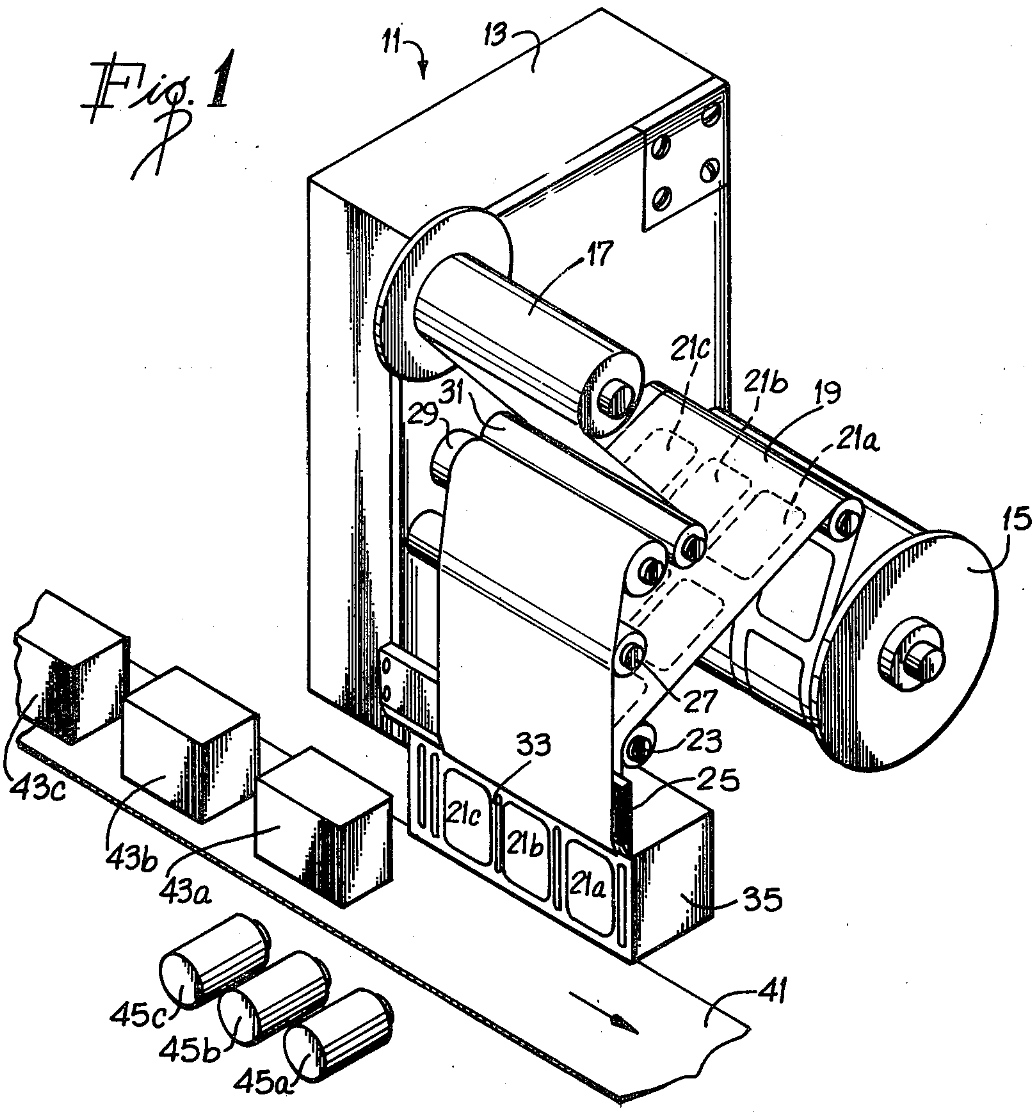
FIG. 1 is a perspective view of a label applicator constructed in accordance with the teachings of this invention and being used to apply labels to articles.

FIG. 1 shows a label applicator 11 which includes a supporting structure 13 in the form of a housing, a supply reel 15 suitably rotatably mounted on the supporting structure, and a take-up reel 17 also rotatably mounted on the supporting structure. A relatively wide backing strip 19 of release paper or other suitable material is wound on the supply reel 15. Labels **21*a*, 21*b*, and 21*c* are arranged in three elongated side-by-side columns, respectively, on the backing strip 19. The labels 21*a*, 21*b*, and 21*c* are adhesively secured to the backing strip 19**.

The backing strip 19 extends over a guide roller 23, a peeling bar 25, a guide roller 27, and between a drive roller 29 and a cooperating pinch roller 31 to the take-up reel 17. The peeling bar 25 and the various rollers are all suitably mounted on the supporting structure 13. In the embodiment illustrated, the drive roller 29 is driven intermittently to move or index the backing strip 19 from the supply reel 15 across the peeling bar 25 to take-up reel 17. The motor and controls for providing this intermittent movement of the backing strip 19 are not illustrated or further described herein inasmuch as they are well known to those skilled in the art.

Figure 2:
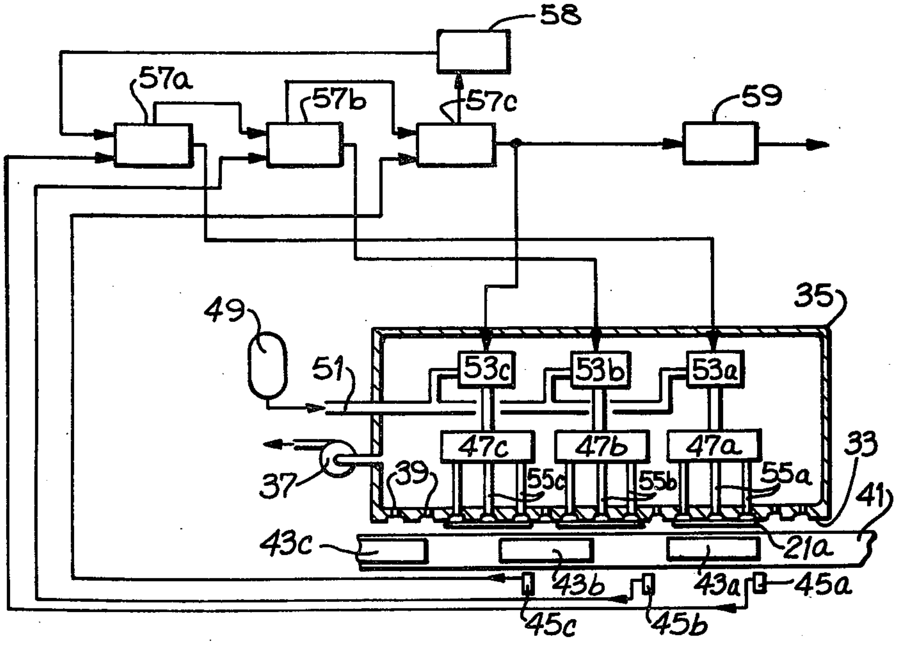
FIG. 2 is a schematic view showing by way of example how the labels can be retained in a row and then transferred to articles.

As the backing strip 19 moves across the peeling bar 25, three of the labels **21*a*, 21*b*, and 21*c* are removed from the backing strip and applied to an air pervious wall 33 at a labelling station with the adhesive side of the labels facing outwardly. The air pervious wall 33 forms one wall of a vacuum box 35 which is suitably mounted on the supporting structure 13. The interior of the vacuum box 35 is maintained at a pressure less than atmospheric in any suitable manner such as by a vacuum pump 37 (FIG. 2) so the suction provided by the vacuum box 35 releasably retains the removed labels 21*a*, 21*b*, and 21*c* against the outer surface of the air pervious wall 33. The air pervious wall 33 may be of many different constructions so long as it is capable of applying suction to the removed labels, and in the embodiment illustrated it includes a series of apertures 39 (FIG. 2**).

The removed labels **21*a*, 21*b*, and 21*c* are arranged in a row on the air pervious wall 33. A conveyor 41 moves a plurality of articles, including the articles 43*a*, 43*b*, and 43*c*, in a first direction through the labelling station. The axis of the row of removed labels is parallel to the direction of movement of the articles, and the conveyor 41** moves the articles relatively close to the exposed adhesive side of the removed labels.

Sensors **45*a*,45*b*,and 45*c* are responsive to the location of the articles 43*a*,43*b*,and 43*c*, respectively, to provide control signals which bring the transfer of the removed labels from the air pervious wall 33 to the associated articles. Although the label transfer function can be brought about in many different ways, in the embodiment illustrated, it is accomplished utilizing an air blast as shown in FIG. 2**.

Three separate air manifolds **47*a*, 47*b*, and 47*c* are suitably mounted within the vaccum box 35. The air manifolds 47*a*, 47*b*, and 47*c* are supplied with compressed air from a suitable source such as a storage tank 49 via a conduit 51 and solenoid valves 53*a*, 53*b*, and 53*c*. A series of flexible tubes 55*a*, 55*b*, and 55*c* convey compressed air from the air manifolds 47*a*, 47*b*, and 47*c*, respectively, to the apertures 39 in the pervious wall 33. For example, the flexible tubes 55*a*, 55*b*, and 55*c* may be arranged as shown in common assignee's U.S. Pat. No. 3,885,705. As shown in FIG. 2, some of the apertures 39 do not receive any of the flexible tubes and are, therefore, available to transmit suction to retain the removed labels 21*a*, 21*b*, and 21*c* against the outer surface of the air pervious wall 33. This suction force can be overcome by an air blast from any one of the air manifolds 47*a*, 47*b*, and 47*c* to transfer the associated label from the air pervious wall 33. Accordingly, the label transferring sequence can be controlled by controlling the opening and closing of the solenoid valves 53*a*, 53*b*, and 53*c***.

The present invention provides for a transferring sequence in which the label which is farthest downstream in the direction of movement of the articles is the next label to be applied. This can be brought about in many different ways utilizing one or more sensors and various controls, and the arrangement shown in FIG. 2 is purely illustrative. Similarly, the means for supplying labels to the labelling station, as well as the means for retaining the labels at the labelling station, are purely illustrative as these functions can be carried out by many different structures.

Figure 3:
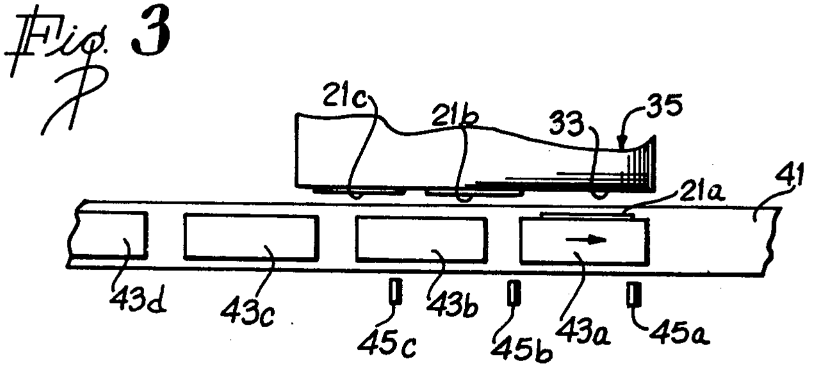
FIGS. 3–3*b* are partially schematic plan views showing how the reverse firing sequence can be implemented.
Figure 3A:
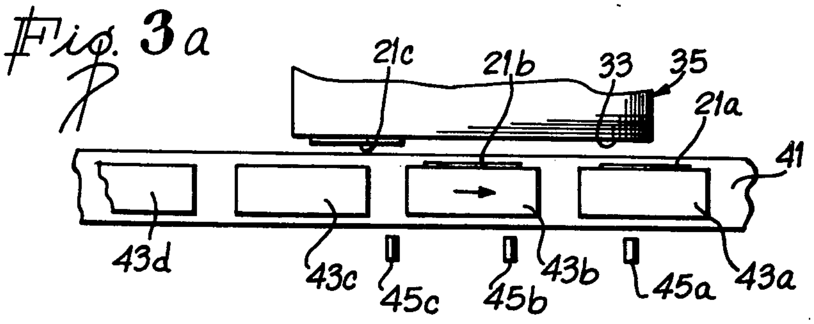
Figure 3B:
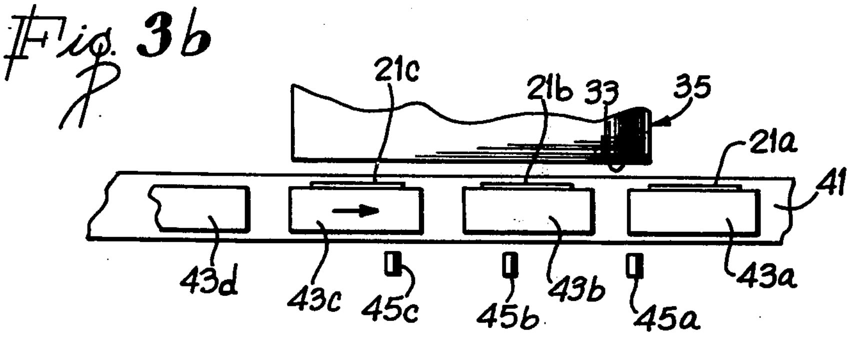

The reverse firing sequence is illustrated diagrammatically in FIGS. 3–**3*b*. With the removed labels 21*a*, 21*b*, and 21*c* arranged in a row as shown in FIG. 1, they are ready for application to the associated articles. As the conveyor 41 moves the articles 43*a*, 43*b*, and 43*c* in the direction of the arrows in FIGS. 1 and 3–3*b*, the sensor 45*a* detects the presence of the article 43*a* and brings about, as described more fully hereinbelow, the opening of the valve 53*a* to provide an air blast from the air manifold 47*a*. The air blast from the air manifold 47*a* is sufficient to transfer the most downstream label; i.e., the label 21*a*, to the associated article 43*a* as shown in FIG. 3. As the conveyor 41 continues to move the articles, the sensor 45*b*, detects the presence of the article 43*b* and brings about the opening of the solenoid valve 53*b* to transfer the most downstream label on the pervious wall 33; i.e., the label 21*b* to the article 43*b*** as shown in FIG. 3*a*. Similarly, the sensor 45*c* brings about the transfer of the label 21*c* to the article 43*c* as shown in FIG. 3*b*.

With all of the removed labels transferred to associated articles, the backing strip 19 is again indexed to supply three other removed labels to the air pervious wall 33. It is important to note that an article 43*d* which is the next article to be labelled must travel from the position shown in FIG. 3*b* across nearly the full length of the air pervious wall 33 to the right end of the air pervious wall. During this relatively long travel time, the next group of labels is being removed from the backing strip 19 and fed to the air pervious wall 33. In the embodiment illustrated, the article 43*d* must travel several times farther during the indexing operation than it would travel in a conventional label applicating operation. This additional distance provides increased time for removing the second group of labels from the backing strip 19 and feeding the removed labels to the air pervious wall 33.

FIG. 2 shows one way of controlling the solenoid valves 53*a*, 53*b*, and 53*c*, it being understood that these valves may be controlled in many different ways. The controls include, in addition to the sensors 45*a*, 45*b*, and 45*c*, delay devices 57*a*, 57*b*, 57*c*, 58 and 59.

Each of the sensors 45*a*, 45*b*, and 45*c* may be any device such as a microswitch or photocell which is capable of detecting the presence of one of the articles. In the embodiment shown in FIG. 2, each of these sensors comprises a photocell, the light beam to which is broken by the presence of an article in front of the sensor.

Each of the delay devices 57*a*, 57*b*, and 57*c* is identical and may comprise an integrated circuit. Each of the delay devices 57*a*, 57*b*, and 57*c* has two input signals; i.e., an enable signal and a firing signal and one output signal with the output signal controlling the associated one of the solenoid valves 53*a*, 53*b*, and 53*c*.

For example, the delay 57*a* receives input signals from the sensor 45*a* and from the delay device 57*c* with the latter signal being provided through the delay device 58 to enable the delay device 57*a*. Assuming that the delay device 57*a* is enabled, the firing signal provided by the sensor 45*a*, when the article 43*a* passes in front of this sensor to interrupt the light beam, will cause the delay device 57*a* to provide an output signal, which may occur after a predetermined short delay time, to the solenoid valve 53*a* to temporarily open the same to transfer the label 21*l*. The delay time is selected so that the label 21*a* will be applied to the desired location on the article 43*a*.

Immediately after the delay device 57*a* receives both its enable signal and its firing signal, it provides an enable signal to the delay device 57*b* to enable that delay device. Although the delay device 57*b* is enabled, it will respond only to a firing signal which is received after it is enabled and which is the result of the leading edge of the article 43*b* passing in front of the sensor 45*b*. In other words, if the signal provided by the sensor 45*b* is high when a space between articles confronts that sensor and low when an article confronts that sensor, the delay device 57*b* will respond only to a signal change from high to low which occurs after the delay devices 57*b* is enabled. For this reason, the delay device 57*b* is not actuated even if the article 43*a* is in front of the sensor 45*b* when the delay device 57*b* receives its enable signal. Accordingly, when the sensor 45*b* senses the presence of the article 43*b*, the delay device 57*b* provides an output signal, after a predetermined short delay to the solenoid valve 53*b* to temporarily open the same and transfer the label 21*b*.

The delay device 57*c* is similarly enabled by an enable signal from the delay device 57*b* which is provided immediately after the delay device 57*b* receives both its enable signal from the delay device 57*a* and its firing signal from the sensor 45*b*. Accordingly, a signal from the sensor 45*c* resulting from the presence of the article 43*c* causes the latter to be labelled.

The delay device 57*a* is enabled by an enable signal from the delay device 57*c* which is provided immediately after the delay device 57*c* receives both its enable signal from the delay device 57*b* and its firing signal from the sensor 45*c*. However, the enable signal to the delay device 57*a* is delayed by a suitable delay device 58. The delay interposed by the delay device 58 is of sufficient length to allow the article 43*c* to travel past the sensor 45*a*. This prevents the sensor 45*a* from sensing the articles 43*b* and 43*c* and causing a second label to be applied to them.

The delay device may be either analog or digital and may be provided by those skilled in the art. For example, each of these delay devices may include a type D flip flop coupled to receive the enable signal to enable the delay device. An appropriate gate or gates, such as a NAND gate, amy be coupled to receive the output of the flip flop and the firing signal to provide a signal which can be used as the enable signal for the next delay device and which is suitably delayed, as by two one-shot generators to provide the output signal which is used to provide the air blast for label transfer purposes.

The output signal from the delay device 57*c* is also fed to the delay device 59 which provides, after a short delay period, an indexing signal to advance the backing strip 19 to provide a new group of labels on the air pervious wall 33. The delay provided by the delay device 59 is of sufficient length to assure that the label 21*c* has been transferred from the air pervious wall 33 before a new group of labels is supplied to the air pervious wall.

Although an exemplary embodiment of the invention has been shown and described, many changes, modifications and substitutions may be made by one having ordinary skill in the art without necessarily departing from the spirit and scope of this invention.

We claim:

1. A label applicator for applying labels to articles which are moved in a first direction through a labeling station, said label applicator comprising:

means for releasably retaining first and second of the labels in a row at the labelling station with the axis of the row extending generally in said first direction and with the first label being downstream, in the direction of article movement, of said second label;

means for transferring the first and second labels from the retaining means to first and second of the articles, respectively, as the first and second articles are moved through the labelling station; and control means for controlling said transferring means so that said transferring means initiates transfer of the first label to the first article before initiating transfer of the second label to the second article.

2. A label applicator as defined in claim 1 including supplying means for supplying means for supplying the labels in groups to the retaining means, a first of said groups of labels including said first and second labels, and means for controlling said supplying means so that said supplying means supplies a second group of labels to the retaining means after the last label of said first group is transferred from the retaining means whereby the articles can be moved in said first direction for at least a portion of the time during which the second group of labels is being supplied to the retaining means.

3. A label applicator as defined in claim 2 wherein said supplying means supplies all of the labels of the second group of labels substantially simultaneously to said retaining means.

4. A label applicator as defined in claim 1 wherein said control means includes first and second sensors, said first sensor being responsive to at least the first article reaching a first predetermined location at the labelling station for providing a first control signal, said second sensor being responsive to the second article reaching a second predetermined location at said labelling station for providing a second control signal, said control means including first means responsive at least to the first and second control signals, respectively, for initiating the transfer of the first and second labels, respectively.

5. A label applicator as defined in claim 1 wherein said control means includes sensor means responsive to the location of at least one of said first and second articles for providing a control signal and means responsive to said control signal for initiating the transfer of at least one of said first and second labels.

6. A label applicator as defined in claim 1 wherein said row includes N labels wherein N is a number greater than 2, said N labels including said first and second labels, said transferring means transfers the N labels from the retaining means to N articles, respectively, as each of such N articles moves through the labelling station and said control means controls said transferring means so that said transferring means sequentially initiates the transfer of the N labels to the N articles, respectively, in a reverse firing order.

7. A label applicator as defined in claim 1 wherein said retaining means includes an air pervious wall and means for applying suction to one side of the pervious wall to releasably hold the labels against the other side of the pervious wall.

8. A label applicator as defined in claim 1 wherein said transferring means includes means for blowing the labels off of the retaining means.

9. A label applicator for applying labels to articles which are moved in sequence first to a second station and them to a first station, said label applicator comprising:

means for releasably retaining first and second of the labels at the first and second stations, respectively;

means for transferring the first and second labels from the retaining means to the first and second articles, respectively, as the first and second articles are moved through the first and second stations, respectively; and control means for controlling said transferring means so that said transferring means initiated transfer of the first label to the first article before initiating transfer of the second label to the second article.

10. A label applicator for applying labels to articles which are moved in a first direction through a labelling station, said label applicator comprising:

supplying means for sequentially supplying groups of labels to a labelling station; retaining means for releasably retaining the groups of labels at the labelling station with the labels of each group being in a row which extends generally in said first direction;

means for transferring the labels of each of the groups of labels from the retaining means to a corresponding number of articles, respectively, as such corresponding number of articles are moved through the labelling station; and control means for controlling said transferring means so that said transferring means transfers the labels of each group to the associated articles in sequence.

11. A label applicator as defined in claim 10 wherein said control means controls said transferring means so that said sequence includes transferring the most downstream label of said row until all of the labels of said row have been transferred, and said supplying means supplies a new group of labels to the retaining means after all of the labels from the preceding group have been transferred from the retaining means.

12. A label applicator for applying labels to articles which are moved in sequence, first through a second station and then through a first station, said label applicator comprising:

a supporting structure;

a supply reel adapted to have a relatively wide backing strip wound thereon with the backing strip having at least first and second columns of labels releasably adhered thereto;

a take-up reel adapted to receive said relatively wide backing strip;

means for moving the backing strip from the supply reel to the take-up reel;

means responsive to movement of the backing strip from the supply reel toward the take-up reel for removing first and second labels from the first and second columns, respectively;

means for retaining said first and second labels at the first and second stations, respectively;

means for transferring the first and second labels from the retaining means to first and second of the articles, respectively, as the first and second articles are moved through the first and second stations, respectively; and control means for controlling said transferring means so that said transferring means initiates transfer of the first label to the first article before initiating transfer of the second label to the second article.

13. A method of labelling articles comprising:

retaining a plurality of labels in a row at a labelling station;

advancing a plurality of articles through said labelling station generally from one end of said row to the other end of said row, said plurality of labels including first and second labels with said other end of said row being closer to said first label than to said second label; and nonsimultaneously transferring the first and second labels from said row to first and second of the articles, respectively, as the articles are advanced through the labelling station.

14. A method of labelling articles as defined in claim 13 wherein said step of transferring includes transferring the first label to the first article before the second label is transferred to the second article.

15. A method as defined in claim 14 including supplying a second plurality of labels to the labelling station, retaining the second plurality of labels in a row at the labelling station, advancing a second plurality of the articles through said labelling station generally from one end of said last mentioned rows to the other end of said last mentioned row, at least a portion of said last mentioned step of advancing being carried out during said step of supplying.

16. A method as defined in claim 15 wherein said step of supplying includes supplying the labels of the second plurality of labels to the labelling station substantially simultaneously.

* * * * *